United States Patent
Keilty et al.

(10) Patent No.: US 6,745,135 B2
(45) Date of Patent: *Jun. 1, 2004

(54) MAJORITY COMPONENT PROPORTION DETERMINATION OF A FLUID USING A CORIOLIS FLOWMETER

(75) Inventors: Michael J. Keilty, Lyons, CO (US); Andrew T. Patten, Boulder, CO (US)

(73) Assignee: Micro Motion, Inc., Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 10/419,606

(22) Filed: Apr. 21, 2003

(65) Prior Publication Data

US 2003/0208325 A1 Nov. 6, 2003

Related U.S. Application Data

(63) Continuation of application No. 09/941,333, filed on Aug. 29, 2001, now Pat. No. 6,636,815.

(51) Int. Cl.[7] .................................................. G01F 1/00
(52) U.S. Cl. .................. 702/45; 702/100; 73/1.16; 73/861; 73/861.01; 73/861.04; 73/861.354
(58) Field of Search ................ 702/45, 100; 73/1.16, 73/861, 861.01, 861.04, 861.354

(56) References Cited

U.S. PATENT DOCUMENTS

| | | | | |
|---|---|---|---|---|
| 3,304,766 A | * | 2/1967 | Hubby | 73/61.44 |
| 5,103,181 A | * | 4/1992 | Gaisford et al. | 324/637 |
| 5,602,346 A | * | 2/1997 | Kitami et al. | 73/861.356 |
| 5,654,502 A | * | 8/1997 | Dutton | 73/152.18 |
| 5,661,232 A | * | 8/1997 | Van Cleve et al. | 73/54.05 |
| 5,687,100 A | * | 11/1997 | Buttler et al. | 702/137 |
| 5,861,561 A | * | 1/1999 | Van Cleve et al. | 73/861.52 |
| 6,360,579 B1 | * | 3/2002 | De Boom et al. | 73/1.35 |
| 6,471,487 B2 | * | 10/2002 | Keilty et al. | 417/26 |
| 6,604,051 B1 | * | 8/2003 | Morrow et al. | 702/24 |
| 6,636,815 B2 | * | 10/2003 | Keilty et al. | 702/45 |

* cited by examiner

Primary Examiner—John E. Barlow
Assistant Examiner—Anthony T. Dougherty
(74) Attorney, Agent, or Firm—Duft Setter Ollila & Bornsen LLC

(57) ABSTRACT

A system, method, and software are disclosed that determine a proportion of a majority component of a fluid that is flowing through a Coriolis flowmeter. Circuitry receives pickoff signals and a temperature signal from the Coriolis flowmeter responsive to the fluid being flowed through the Coriolis flowmeter. The circuitry processes the pickoff signals and the temperature signal to determine a proportion of the majority component relative to the fluid. To determine the proportion of the majority component in one example, the circuitry determines a first volumetric flow rate based on a measured mass flow rate of the fluid and a reference density of the majority component. The circuitry then determines a second volumetric flow rate based on a measured volumetric flow rate, a temperature-varying density, and the reference density. The circuitry determines the proportion of the majority component based on the first volumetric flow rate and the second volumetric flow rate. The circuitry can advantageously determine the purity of the fluid to more accurately measure volumetric flow rates.

20 Claims, 8 Drawing Sheets

MAJORITY COMPONENT PROPORTION DETERMINATION OF A FLUID USING A CORIOLIS FLOWMETER

RELATED APPLICATIONS

This application is a continuation of a U.S. Ser. No. 09/941,333, filed Aug. 29, 2001, now U.S. Pat. No. 6,636,815, which is incorporated herein by reference.

FIELD OF THE INVENTION

The invention relates to flowmeters, and in particular, to methods and systems for determining a proportion of a majority component relative to a fluid flowing through a Coriolis flowmeter.

STATEMENT OF THE PROBLEM

When a fluid that is being delivered through a pipline is measured, the amount of the fluid delivered is measured in terms of volumetric flow. The term "fluid" refers to any material in a liquid or solid state that flows. The volumetric flow rate is used to bill a customer for the amount of fluid delivered. A turbine, a positive displacement meter, or some other measurement system, measures the volume of the fluid as the fluid is delivered to the customer. The measurement system also measures the temperature of the fluid. The measurement system adjusts the volumetric measurement to a reference temperature. The customer is then billed based on the adjusted volumetric measurement.

Many fluids are sold based on standard conditions, which means that the measurement system assumes that the fluid being sold is pure. However, the fluid may be comprised of more than one component. A majority component represents a pure fluid that is being measured, such as the fluid being sold. The minority components represent impurities mixed in with the majority component.

For example, propane that is delivered to customers can be mixed with other components such as ethane, methane, etc. The ethane and methane are impurities that negatively affect the purity of the propane. A mixture of propane, ethane, and methane includes a discrete propane component, a discrete ethane component, and a discrete methane component. Unfortunately, turbines and positive displacement meters cannot effectively determine the proportion of the majority component relative to the fluid being delivered to a customer. Consequently, the customers are billed as if the fluid is pure.

One way to measure a mass flow of a fluid is with a Coriolis-effect mass flowmeter. Coriolis flowmeters measure mass flow and other information for fluids flowing through a flow tube in the flowmeter. Exemplary Coriolis flowmeters are disclosed in U.S. Pat. No. 4,109,524 of Aug. 29, 1978, U.S. Pat. No. 4,491,025 of Jan. 1, 1985, and Re. 31,450 of Feb. 11, 1982, all to J. E. Smith et al. Flowmeters are comprised of one or more flow tubes of a straight or curved configuration. Each flow tube configuration in a Coriolis flowmeter has a set of natural modes of vibration, which may be of a simple bending, twisting, torsional or coupled type. Each flow tube is driven to oscillate at a resonance in one of these natural modes of vibration. Fluid flows into the flowmeter from a connected pipeline on the inlet side of the flowmeter. The fluid is directed through the flow tube(s), and exits the flowmeter through the outlet side of the flowmeter. The natural vibration modes of the vibrating, fluid-filled system are defined in part by the combined mass of the flow tubes and the mass of the fluid flowing through the flow tubes.

As fluid begins to flow, Coriolis forces cause points along the flow tubes to have a different phase. The phase on the inlet side of the flow tube commonly lags the driver while the phase on the outlet side of the flow tube leads the driver. Pickoffs are affixed to the flow tube(s) to measure the motion of the flow tube(s) and generate pickoff signals that are representative of the motion of the flow tube(s).

Meter electronics or any other ancillary electronics or circuitry connected to the flowmeter receive the pickoff signals. The meter electronics processes the pickoff signals to determine the phase difference between the pickoff signals. The phase difference between two pickoff signals is proportional to the mass flow rate of fluid through the flow tube(s). Therefore, the meter electronics can determine the mass flow rate of a fluid flowing through the flowmeter based on the pickoff signals.

An important component of Coriolis flowmeters and of vibrating tube densitometers is the drive or excitation system. The drive system operates to apply a periodic physical force to the flow tube, which causes the flow tube to oscillate. The drive system includes a driver mechanism mounted to the flow tube(s) of the flowmeter. The drive system also includes a drive circuit that generates a drive signal to operate the driver mechanism. The driver mechanism typically contains one of many well known arrangements, such as a magnet mounted to one flow tube and a wire coil mounted to the other flow tube in an opposing relationship to the magnet.

A drive circuit continuously applies a periodic driver voltage to the driver mechanism. The drive voltage is typically sinusoidally or square shaped. In a typical magnetic-coil drive mechanism, the periodic drive voltage causes the coil to produce a continuous alternating magnetic field. The alternating magnetic field of the coil and the constant magnetic field produced by the magnet force the flow tube(s) to vibrate in a sinusoidal pattern. Those skilled in the art will appreciate that any device capable of converting an electrical signal to mechanical force is suitable for application as a driver mechanism (See, U.S. Pat. No. 4,777,833 issued to Carpenter and assigned on its face to Micro Motion, Inc.). Also, the driver signal is not limited to a sinusoidal signal, but may be any periodic signal (See, U.S. Pat. No. 5,009,109 issued to Kalotay et. al. and assigned on its face to Micro Motion, Inc.).

As stated above, the meter electronics determines the mass flow rate of a fluid flowing through the flowmeter. The meter electronics also infers the density of the fluid based on the pickoff signals. Any density variations that are different than the known, reference densities are assumed to be due to temperature and not due to the purity of the fluid. Based on the measured mass flow rate and the inferred density of the fluid, the meter electronics determines the volumetric flow rate of the fluid flowing through the flowmeter. Unfortunately, current Coriolis flowmeters have not been effectively adapted to measure the proportion of a majority component relative to the fluid. Customers may therefore be billed for less than pure fluids.

STATEMENT OF THE SOLUTION

The invention helps to solve the above problems, and an advance in the art is made, by systems, methods, and software configured to determine a proportion of a majority component relative to a fluid flowing through a Coriolis flowmeter. The invention advantageously provides a more accurate measurement of the amount, purity, and quality of a fluid being delivered. The invention also allows customers to be more accurately billed for fluids being purchased.

In one example of the invention, circuitry is configured to communicate with a Coriolis flowmeter to implement the invention. The circuitry comprises an interface means configured to receive pickoff signals and a temperature signal from the Coriolis flowmeter responsive to a fluid flowing through the Coriolis flowmeter. The fluid comprises a majority component. The interface means is also configured to transfer the pickoff signals and temperature signal to the processing means. The processing means is configured to process the pickoff signals and the temperature signal to determine a proportion of the majority component relative to the fluid.

In another example of the invention, the circuitry executes the following process to determine the proportion of the majority component. To start, the circuitry processes the pickoff signals to determine a mass flow rate of the fluid. The circuitry then divides the mass flow rate by a reference density of the majority component to yield a first volumetric flow rate. The reference density represents the density of the majority component at a reference temperature. The circuitry then processes the pickoff signals to determine a measured volumetric flow rate of the fluid flowing through the Coriolis flowmeter. The circuitry then determines a temperature-varying density. The circuitry multiplies the measured volumetric flow rate by the temperature-varying density to yield a product. The circuitry then divides the product by the reference density to yield a second volumetric flow rate. If the first volumetric flow rate equals the second volumetric flow rate, then the fluid is substantially pure. If the first volumetric flow rate does not equal the second volumetric flow rate, then the fluid is comprised of one or more minority components in addition to the majority component.

In another example of the invention, the circuitry executes the following process to determine the proportion of the majority component. To start, the circuitry processes the pickoff signals to determine a measured density of the fluid. The circuitry then processes the temperature signal to determine a temperature of the fluid. The circuitry determines a temperature-varying density based on the temperature. If the measured density equals the temperature-varying density, then the fluid is substantially pure. If the measured density does not equal the temperature-varying density, then the fluid is comprised of one or more minority components in addition to the majority component.

DESCRIPTION OF THE DRAWINGS

The above and other features of the invention can be understood from reading the detailed description and the following drawings.

DETAILED DESCRIPTION

Figure 1:
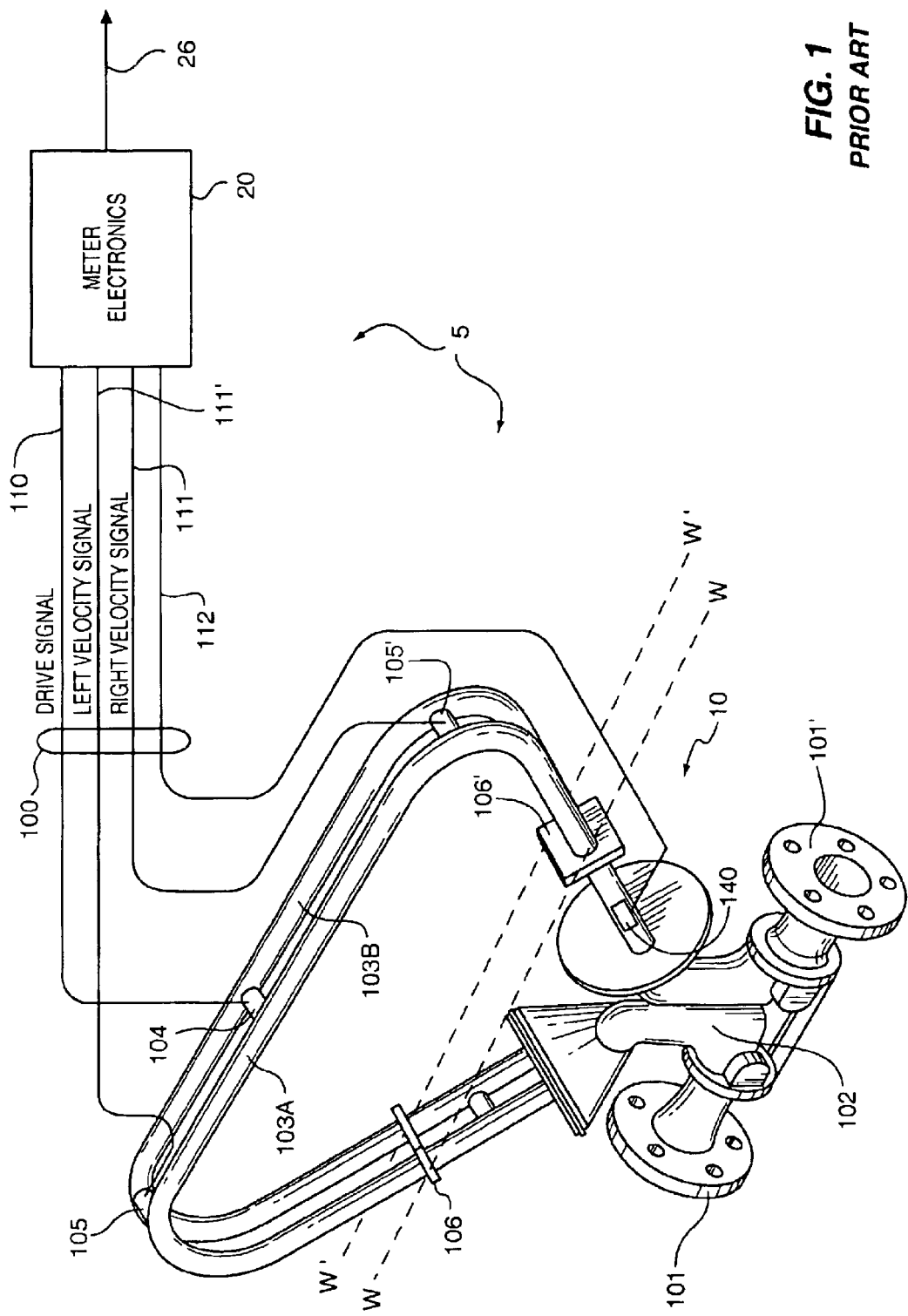
FIG. 1 illustrates a dual tube Coriolis flowmeter in the prior art.
Figure 2:
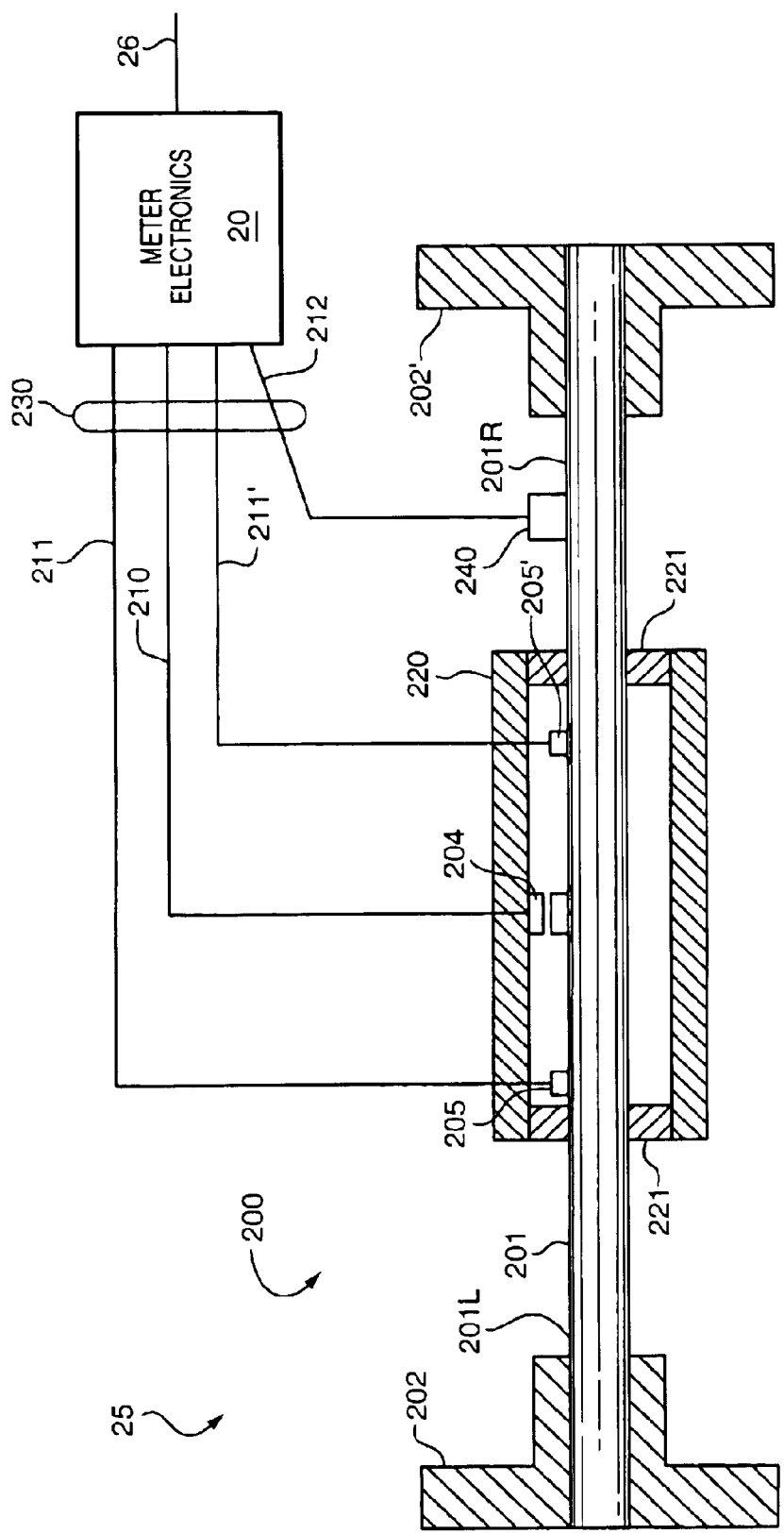
FIG. 2 illustrates a single straight tube Coriolis flowmeter the prior art.
Figure 3:
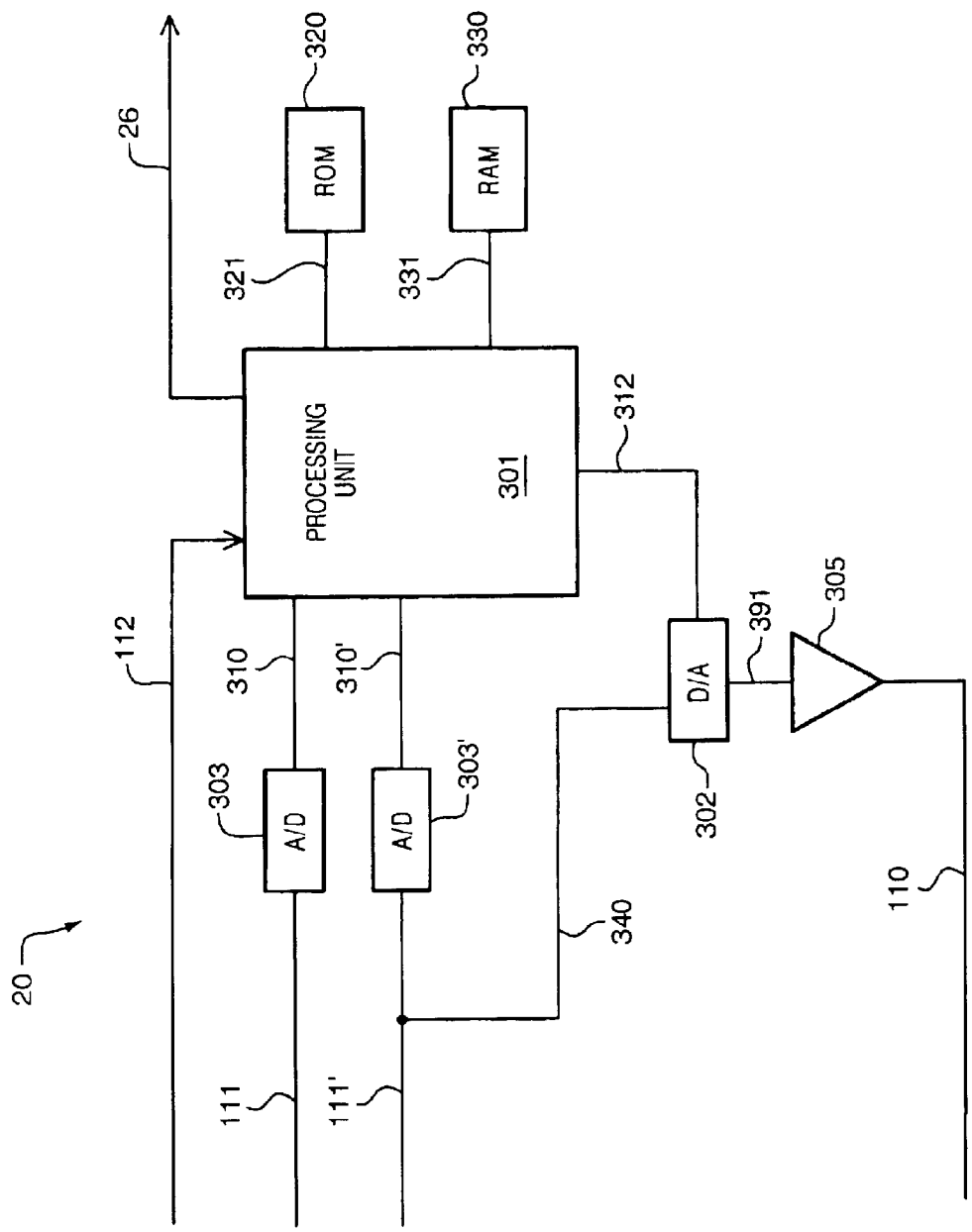
FIG. 3 is a block diagram illustrating meter electronics configured to communicate with a Coriolis flowmeter in an example of the invention.

FIGS. 1–3 show examples of systems that can be used to implement the invention. The scope of the invention is not limited to the particular components shown and described in FIGS. 1–3, but rather the scope of the invention is defined by the claims.

Dual Tube Coriolis Flowmeter—FIG. 1

FIG. 1 shows a Coriolis flowmeter 5 in the prior art. Coriolis flowmeter 5 comprises a Coriolis sensor 10 and meter electronics 20. Meter electronics 20 is connected to Coriolis sensor 10 via leads 100. Meter electronics 20 is configured to provide density, mass flow rate, volumetric flow rate, totalized mass flow, and other information over path 26. Coriolis flowmeter 5 is described although it is apparent to those skilled in the art that the present invention could be practiced in conjunction with any apparatus having a vibrating flow tube to measure properties of fluid. A second example of such an apparatus is a vibrating tube densitometer, which does not have the additional measurement capability provided by a Coriolis mass flowmeter.

Coriolis sensor 100 includes a pair of process connections 101 and 101', manifold 102, and flow tubes 103A and 103B. Driver 104, pickoff 105, and pickoff 105' are connected to flow tubes 103A and 103B. Brace bars 106 and 106' serve to define the axis W and W' about which each flow tube oscillates. Those skilled in the art will appreciate that additional pickoffs may be needed to implement the invention. The invention is not limited to the configuration in FIG. 1 as FIG. 1 merely shows an example of a system to implement the invention.

When Coriolis sensor 100 is inserted into a pipeline system (not shown) which carries the fluid that is being measured, the fluid enters Coriolis sensor 10 through process connection 101. The fluid passes through manifold 102. Manifold 102 directs the fluid to enter flow tubes 103A and 103B. The fluid flows through flow tubes 103A and 103B and back into manifold 102. The fluid exits Coriolis sensor 10 through process connection 101'.

Flow tubes 103A and 103B are selected and appropriately mounted to the manifold 102 so as to have substantially the same mass distribution, moments of inertia, and elastic modules about bending axes W—W and W'—W', respectively. Flow tubes 103A and 103B extend outwardly from the manifold 102 in an essentially parallel fashion.

Flow tubes 103A–103B are driven by driver 104 in phase opposition about their respective bending axes, W and W', at what is termed the first out of phase bending mode of the flowmeter 5. Driver 104 may comprise any one of many well known arrangements, such as a magnet mounted to flow tube 103A and an opposing coil mounted to flow tube 103B, through which an alternating current is passed for vibrating both flow tubes 103A–103B. Meter electronics 120 applies a drive signal to driver 104 via lead 110.

Driver 104 vibrates flow tubes 103A and 103B responsive to the drive signal. Pickoffs 105 and 105' generate pickoff signals responsive to the natural modes of vibration of flow tubes 103A and 103B. Pickoffs 105 and 105' transmit the pickoff signals to meter electronics 20 on leads 111 and 111', respectively. Pickoff signals from pickoffs 105 and 105' can be referred to as left and right velocity signals, respectively. Meter electronics 20 processes the left and right velocity signals to compute the mass flow rate, volumetric flow rate, totalized mass flow, and the density of the fluid passing through Coriolis sensor 10. Meter electronics 20 applies the mass flow rate, volumetric flow rate, totalized mass flow, and the density information to path 26.

Temperature sensor 140 is connected to one or both of vibrating flow tubes 103A and 103B. Temperature sensor 140 detects the temperature of the fluid flowing through flow tubes 103A and 103B. Temperature sensor 140 generates a temperature signal. Temperature sensor 140 transmits the temperature signal to meter electronics 20 over lead 112.

Those skilled in the art understand that Coriolis flowmeter 5 is quite similar in structure to a vibrating tube densitometer. Vibrating tube densitometers also utilize a vibrating tube through which fluid flows. In the case of sample-type densitometers, the sample-type densitometers utilize a vibrating tube within which fluid is held. Vibrating tube densitometers also employ a drive system for exciting the flow tube to vibrate. Vibrating tube densitometers typically utilize only a single feedback signal because a density measurement requires only the measurement of frequency, and a phase measurement is not necessary. The descriptions of the present invention herein apply equally to vibrating tube densitometers.

A Single Straight Tube Coriolis Flowmeter—FIG. 2

FIG. 2 shows Coriolis flowmeter 25 in the prior art. Coriolis flowmeter 25 comprises a Coriolis sensor 200 and meter electronics 20. Meter electronics 20 is connected to Coriolis sensor 200 via leads 230. Meter electronics 20 is configured to provide density, mass flow rate, volumetric flow rate, totalized mass flow, and other information over path 26.

Flow tube 201 includes a left end portion designated 201L and a right end portion designated 201R. Flow tube 201 and its ends portions 201L and 201R extend the entire length of the flowmeter 25 from an input end of flow tube 201 to an output end of flow tube 201. Coriolis sensor 200 includes a balance bar 220 that is connected at its ends to flow tube 201 by brace bar 221.

Left end portion 201L is affixed to an inlet process connection 202. Right end portion 201R is affixed to an outlet process connection 202'. Inlet process connection 202 and outlet process connection 202' are configured to connect Coriolis sensor 200 to a pipeline (not shown).

In a well known conventional manner, a driver 204, a left pickoff 205, and a right pickoff 205' are coupled to flow tube 201 and balance bar 220. Meter electronics 20 transmits a driver signal to driver 204 over conductors 210. Responsive to the driver signal, driver 204 vibrates flow tube 201 and balance bar 220 in phase opposition at the resonant frequency of the fluid-filled flow tube 201. The oscillation of vibrating flow tube 201 induces Coriolis deflections in the flow tube 201 in a well known manner. The pickoffs 205 and 205' detect the Coriolis deflections and transmit pickoff signals that represent the Coriolis deflections over conductors 211 and 211'.

Temperature sensor 240 is connected to flow tube 201. Temperature sensor 240 detects the temperature of the fluid flowing through flow tube 201. Temperature sensor 240 generates a temperature signal. Temperature sensor 240 transmits the temperature signal to meter electronics 20 over lead 212.

Meter Electronics—FIG. 3

FIG. 3 shows meter electronics 200 in an example of the invention. In this example, meter electronics 20 is shown to operate with Coriolis sensor 10 in FIG. 1. Meter electronics 20 is comprised of Analog to Digital (A/D) convertors 303 and 303', processing unit 301, Read Only Memory (ROM) 320, Random Access Memory (RAM) 330, Digital to Analog (D/A) convertor 302, and amplifier 305. Meter electronics 20 is configured to provide density, mass flow rate, volumetric flow rate, totalized mass flow, and other information over path 26. Path 26 carries signals to input and output means (not shown), which allow meter electronics 20 to communicate with ancillary electronics, such as a computer.

In operation, A/D convertors 303 and 303' receive the left and right velocity signals from pickoffs 105 and 105', respectively. A/D convertors 303 and 303' convert the left and right velocity signals to digital signals usable by processing unit 301. A/D convertors 303 and 303' transmit the digital signals to processing unit 301 over paths 310 and 310'. Although shown as separate components, A/D convertors 303 and 303' may be a single convertor, such a CS4218 Stereo 16-bit codec chip manufactured of Crystal Semi Inc. One skilled in the art will appreciate that any number of pickoffs and other sensors may be connected to processing unit 301. Processing unit 301 also receives the temperature signal over lead 112 from temperature sensor 140 in FIG. 1.

Processing unit 301 is a micro-processor, processor, or group of processors that reads instructions from a storage media and executes the instructions to perform the various functions of flowmeter 5. In a preferred embodiment, processing unit 301 is an ADSP-2185L microprocessor manufactured by Analog Devices. The functions performed include, but are not limited to, computing mass flow rate of a fluid, computing volumetric flow rate of a fluid, and computing density of a fluid. Processing unit 301 stores the functions in ROM 320 and reads the functions from ROM 320 via path 321. Processing unit 301 stores the data and the instructions for performing the various functions in RAM 330. Processor 301 performs read and write operations in RAM 330 via path 331.

Processing unit 301 generates a digital driver signal and transmits the digital driver signal over path 312. D/A convertor 302 receives the digital driver signal and a voltage from one of pickoffs 105 and 105' via path 340. The digital drive signal includes instructions for modifying the voltage received over path 340 to generate an analog drive signal. D/A convertor 302 is a common D/A convertor such as the AD7943 chip produced by Analog Devices. D/A convertor 302 transmits the analog driver signal to amplifier 305 via path 391. Amplifier 305 amplifies the amplitude of the analog drive signal. Amplifier 305 transmits the analog drive signal to driver 104 via path 110. Amplifier 305 may be a current amplifier or a voltage amplifier.

Figure 4:
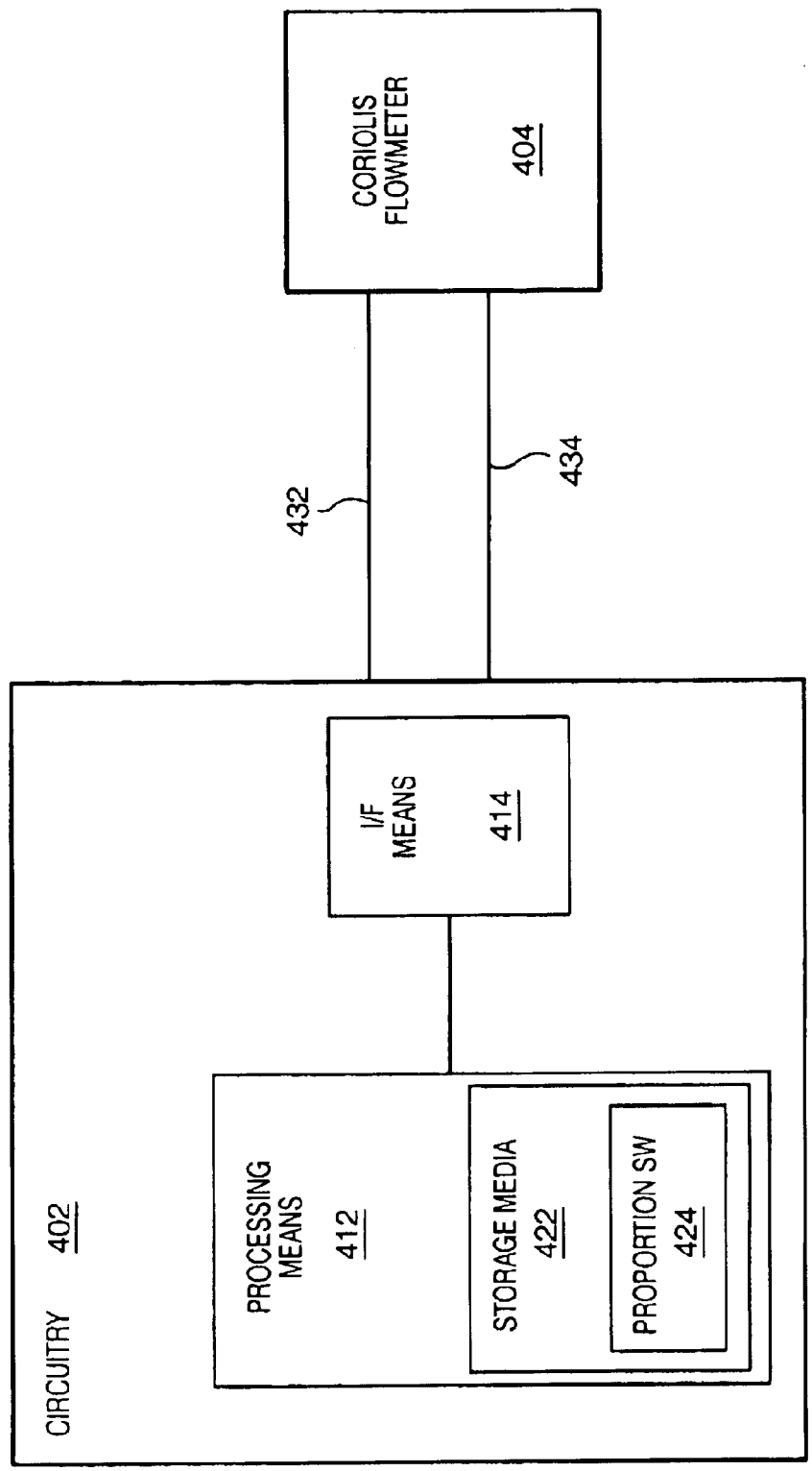
FIG. 4 is a block diagram illustrating circuitry configured to communicate with a Coriolis flowmeter in an example of the invention.

Majority Component Proportion Determination—FIG. 4

FIG. 4 depicts a specific example of circuitry in communication with a Coriolis flowmeter in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 4 have been simplified or omitted for clarity.

FIG. 4 illustrates circuitry 402 in communication with a Coriolis flowmeter 404 in an example of the invention. The circuitry 402 is comprised of an interface means 414 and a processing means 412. Flowmeter 404 is configured to receive a flow of fluid. Flowmeter 404 could be, but is not limited to, flowmeter 5 in FIG. 1 or flowmeter 25 in FIG. 2.

In operation, interface means 414 receives pickoff signals 432 and a temperature signal 434 from flowmeter 404 responsive to the fluid being flowed through flowmeter 404. The fluid comprises a majority component. Interface means 414 transfers the pickoff signals 432 and the temperature signal 434 to processing means 412. Processing means 412 receives the pickoff signals 432 and the temperature signal 434. Processing means 412 processes the pickoff signals 432 and the temperature signal 434 to determine a proportion of the majority component relative to the fluid.

In one example, the operation of circuitry 402 could be performed by processing means 412 executing proportion software 424. Processing means 412 retrieves and executes the proportion software 424 from storage media 422 to perform the above described operation. The proportion software 424 is configured to direct the processing means 412 to 1) receive pickoff signals and a temperature signal from the Coriolis flowmeter responsive to a fluid being flowed through the Coriolis flowmeter wherein the fluid comprises a majority component, and 2) process the pickoff signals and the temperature signal to determine a proportion of the majority component relative to the fluid.

Proportion software 424 includes program code and firmware. Some examples of storage media 422 are memory devices, tape, disks, integrated circuits, and servers. The proportion software 424 is operational when executed by the processing means 412 to direct the processing means to operate in accord with the invention. The processing means 412 refers to a single processing device or a group of inter-operational processing devices. Some examples of processing means 412 are computers, integrated circuits, and logic circuitry. Those skilled in the art are familiar with instructions, processors, and storage media.

Volumetric Flow Rate Determination—FIGS. 5–8

FIGS. 5–8 depict specific examples of logic used by circuitry in communication with a Coriolis flowmeter in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 5–8 have been simplified or omitted for clarity.

Figure 5:
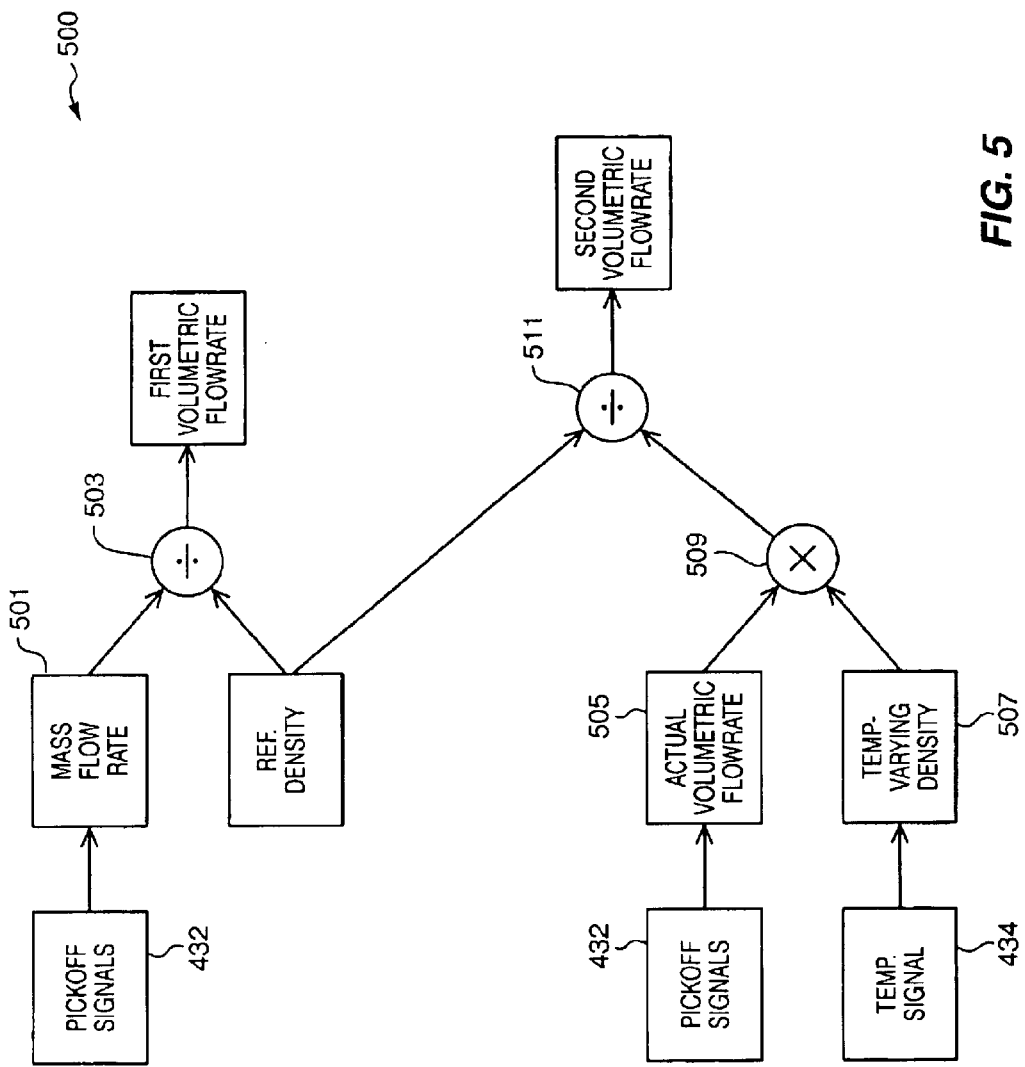
FIG. 5 is a logic diagram illustrating a process to determine a proportion of a majority component in a fluid in an example of the invention.

FIG. 5 illustrates a logic diagram depicting a process 500 executed by circuitry 402 in an example of the invention. For this example, assume that a fluid is flowing through flowmeter 404. To determine the proportion of a majority component in a fluid, circuitry 402 determines a first volumetric flow rate and a second volumetric flow rate and compares the flow rates. To determine the first volumetric flow rate, circuitry 402 processes the pickoff signals 432 to determine a mass flow rate of the fluid in step 501. Circuitry 402 then divides the mass flow rate by a reference density of the majority component to yield the first volumetric flow rate in step 503. The first volumetric flow rate can be represented by the following equation [1]:

$$V_1 = \frac{m}{\rho_{ref}} N - \text{meters}^3/\text{hour} \quad [1]$$

where m represents the mass flow rate and $\rho_{ref}$ represents the reference density.

The density of fluid varies based on temperature and pressure. Fluids, by nature, are relatively incompressible materials. In other words, a change in density based on pressure is minimal compared to a change in density based on temperature. Therefore, a standard pressure is assumed for this example. A density versus temperature curve can be generated for many fluids. A reference temperature and corresponding reference density are then selected for a particular majority component.

To determine the second volumetric flow rate, circuitry 402 processes the pickoff signals 432 to determine a measured volumetric flow rate of the fluid flowing through flowmeter 404 in step 505. Circuitry 402 then determines a temperature-varying density in step 507. The following equation [2] yields the temperature-varying density:

$$\rho_{temp} = -0.00004T^3 - 0.004T^2 - 1.3661T + 530.1 \text{ kg/meter}^3 \quad [2]$$

where T represents a temperature determined from the temperature signal 434.

Circuitry 402 multiplies the measured volumetric flow rate by the temperature-varying density to yield a product in step 509. Circuitry 402 then divides the product by the reference density to yield the second volumetric flow rate in step 511. The second volumetric flow rate is represented by the following equation [3]:

$$V_2 = V_{measured} \frac{\rho_{temp}}{\rho_{ref}} N - \text{meter}^3/\text{hour} \quad [3]$$

where $V_{measured}$ represents the measured volumetric flow rate, $\rho_{temp}$ represents the temperature-varying density, and $\rho_{ref}$ represents the reference density.

If the first volumetric flow rate ($V_1$) equals the second volumetric flow rate ($V_2$), then the fluid is substantially pure. In other words, the fluid is comprised entirely of the majority component. If the first volumetric flow rate ($V_1$) does not equal the second volumetric flow rate ($V_2$), then the fluid contains minority components in addition to the majority component.

Figure 6:
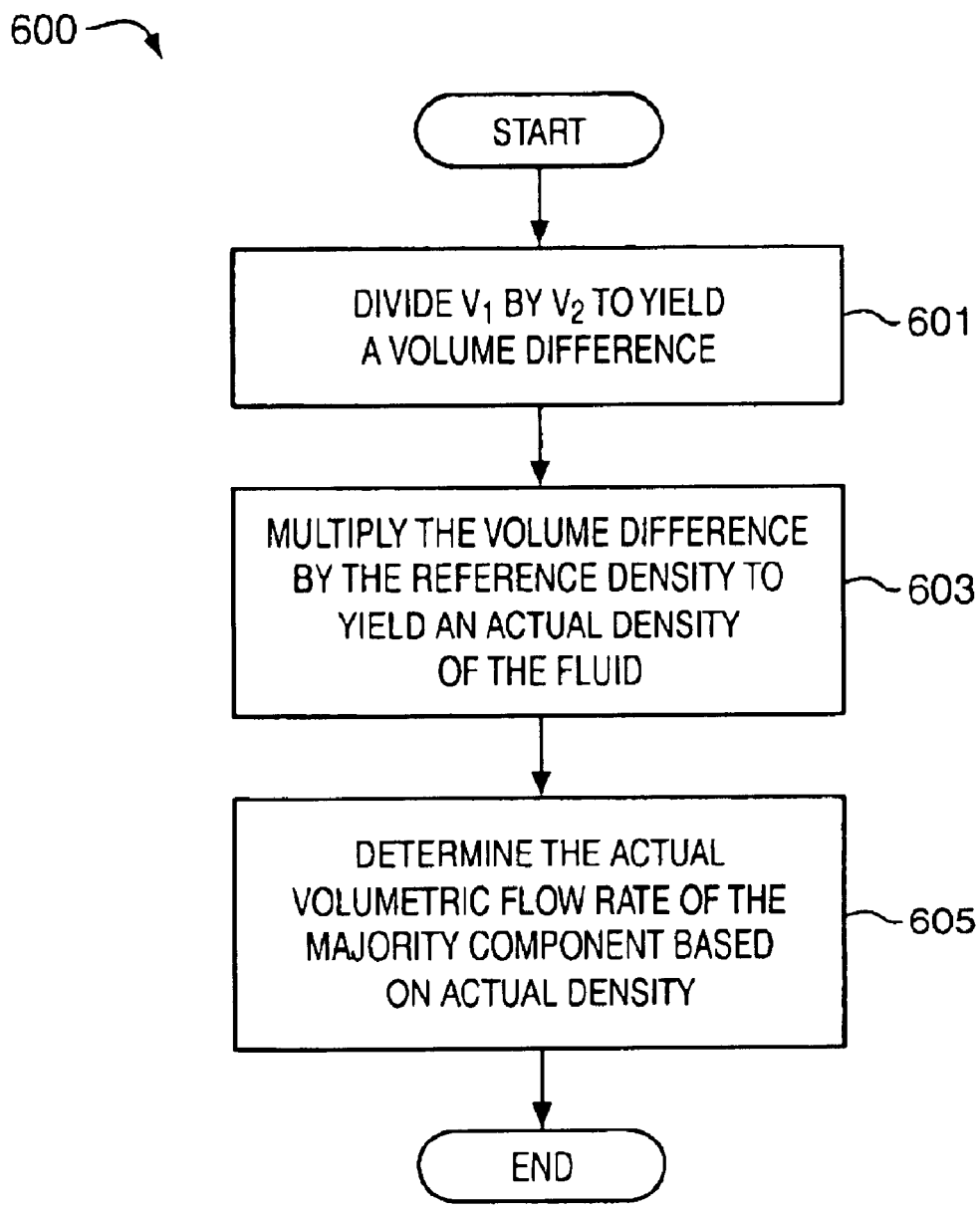
FIG. 6 is a flow diagram illustrating a process executed by circuitry if a fluid contains minority components in an example of the invention.

FIG. 6 shows a flow diagram depicting a process 600 executed by circuitry 402 if the fluid contains minority components in an example of the invention. Circuitry 402 divides the first volumetric flow rate ($V_1$) by the second volumetric flow rate ($V_2$) to yield a volume difference in step 601. The volume difference represents the proportion of the majority component relative to the entire fluid. Circuitry 402 then adjusts the measured volumetric flow rate of the entire fluid based on the proportion of the majority component. To adjust the measured volumetric flow rate, circuitry 402 multiplies the volume difference by the reference density of the majority component to yield an actual density of the fluid in step 603. Circuitry 402 then determines the adjusted volumetric flow rate of the majority component based on the actual density in step 605. The customer is then billed for the majority component based on the adjusted volumetric flow rate.

Figure 7:
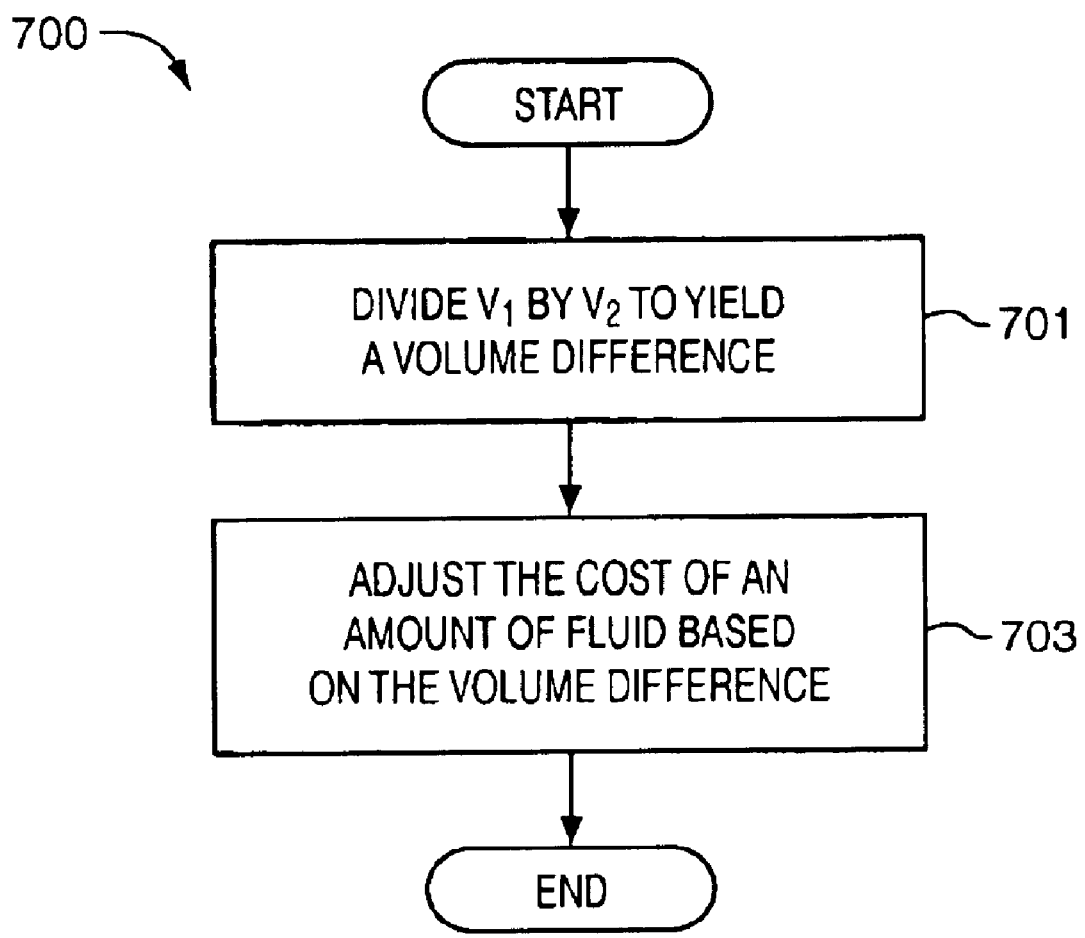
FIG. 7 is a flow diagram illustrating a process executed by circuitry if a fluid contains minority components in an example of the invention.

FIG. 7 shows a flow diagram depicting a process 700 executed by circuitry 402 if the fluid contains minority components in an example of the invention. Circuitry 402 divides the first volumetric flow rate ($V_1$) by the second volumetric flow rate ($V_2$) to yield a volume difference in step 701. When an amount of the fluid is delivered to a customer, circuitry 402 adjusts the cost of the amount of the fluid based on the volume difference in step 703.

Figure 8:
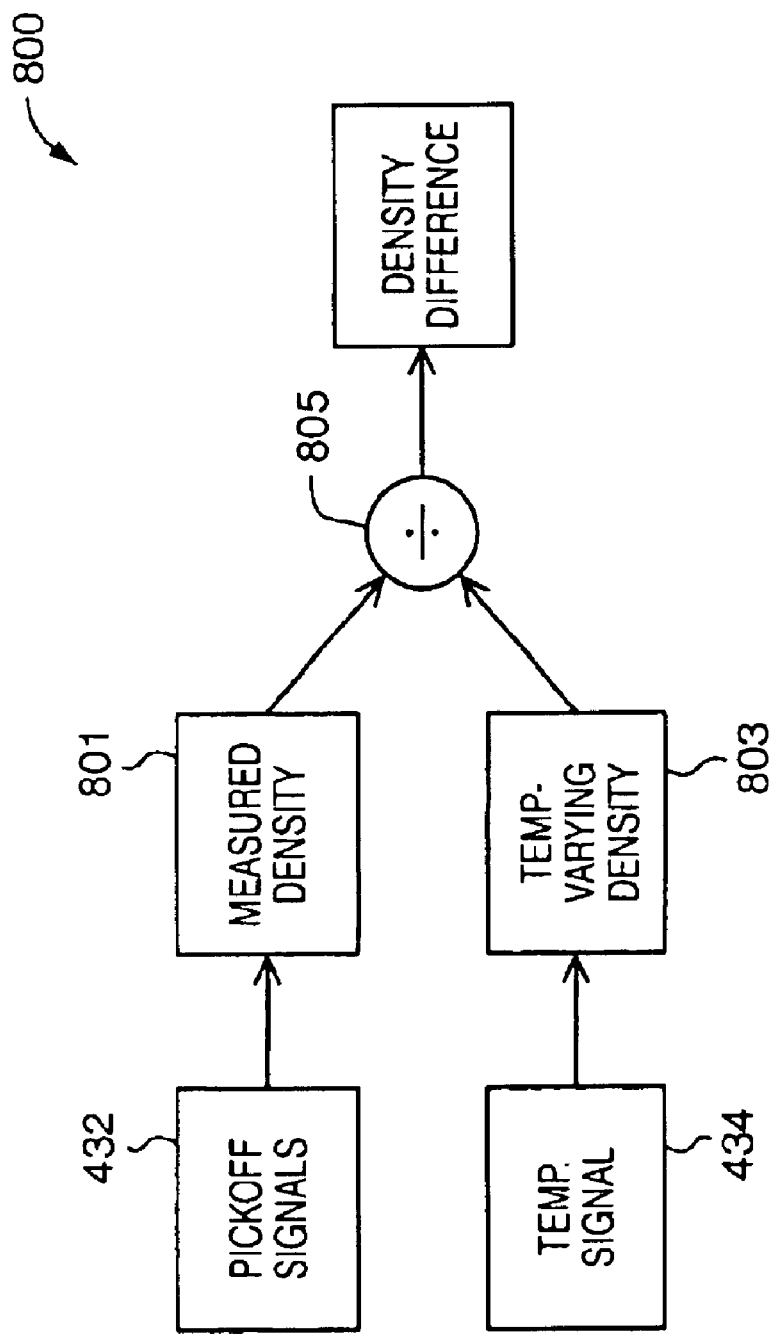
FIG. 8 is a logic diagram illustrating another process to determine a proportion of a majority component in a fluid in an example of the invention.

FIG. 8 illustrates a logic diagram depicting a process 800 executed by circuitry 402 in an example of the invention. For this example, assume that a fluid is flowing through flowmeter 404. To determine the proportion of a majority component in a fluid, circuitry 402 determines a measured density and a temperature-varying density and compares the densities. To start, circuitry 402 processes the pickoff signals 432 to determine a measured density of the fluid in step 801. Circuitry 402 then processes the temperature signal 434 to determine a temperature-varying density using equation [2] in step 803. If the measured density equals the temperature-varying density, then the fluid is substantially pure. If the measured density does not equal the temperature-varying density, then the fluid contains minority components in addition to the majority component.

If the fluid contains minority components, then circuitry 402 divides the measured density by the temperature-varying density to yield a density difference in step 805. Circuitry 402 can then adjust the volumetric flow rate of the majority component based on the density difference as described in FIG. 6 using the density difference instead of the volume difference. Circuitry 402 could also adjust the cost of the amount of the fluid based on the density difference as described in FIG. 7 using the density difference instead of the volume difference.

Majority Component Proportion Determination Example Using Propane

The following are two examples of determining the proportion of propane relative to an entire fluid flowing through flowmeter 404. For the first example, assume that:

m=5000 kg/h
T=25 degrees Celsius
$V_{measured}$=10.146 m³/h where m represents the mass flow rate of the fluid measured by flowmeter 404, T represents the temperature of the fluid flowing through flowmeter 404, and $V_{measured}$ represents the volumetric flow rate of the fluid measured by the flowmeter 404. Also assume that the reference density of propane is 509 kg/m³. Using equation [1], circuitry 402 determines a first volumetric flow rate.

$$V_1 = \frac{m}{P_{ref}} = \frac{5000}{509} = 9.823 \text{ Nm}^3/\text{h}$$

Using equation [2], circuitry 402 determines a temperature-varying density.

$$P_{temp}=-0.00004T^3-0.004T^2-1.3661T+530.1=492.8 \text{ kg/m}^3$$

Using equation [3], circuitry 402 determines a second volumetric flow rate.

$$V_2 = V_{measured}\frac{P_{temp}}{P_{ref}} = 10.146\frac{492.8}{509} = 9.823 \text{ Nm}^3/\text{h}$$

Because equations [1] and [3] yield the same result, the fluid is comprised almost entirely of propane. In other words, the fluid is pure propane.

For the second example, assume that:

m=5000 kg/h
T=25 degrees Celsius
$V_{measured}$=10.25 m³/h where m represents the mass flow rate of the fluid measured by flowmeter 404, T represents the temperature of the fluid flowing through flowmeter 404, and $V_{measured}$ represents the volumetric flow rate of the fluid measured by the flowmeter 404. Also assume that the reference density of propane is 509 kg/m³. Using equation [1], circuitry 402 determines a first volumetric flow rate.

$$V_1 = \frac{m}{P_{ref}} = \frac{5000}{509} = 9.823 \text{ Nm}^3/\text{h}$$

Using equation [2], circuitry 402 determines a temperature-varying density.

$$P_{temp}=-0.00004T^3-0.004T^2-1.3661T+530.1=492.8 \text{ kg/m}^3$$

Using equation [3], circuitry 402 determines a second volumetric flow rate.

$$V_2 = V_{measured}\frac{P_{temp}}{P_{ref}} = 10.25\frac{492.8}{509} = 9.924 \text{ Nm}^3/\text{h}$$

Equations [1] and [3] yield a different result. Therefore, circuitry 402 determines that the difference may be due impurities in the fluid in addition to the propane. In other words, the fluid is not pure propane. Circuitry 402 can then calculate an actual volumetric flow rate that takes into account the impurities in the fluid using the process 600 in FIG. 6.

What is claimed is:

1. A method of operating circuitry in communication with a flowmeter, the method comprising:
   receiving a pickoff signal from the flowmeter responsive to a fluid being flowed through the flowmeter,
   processing the pickoff signal to determine a measured density of the fluid;
   determining a calculated density of the fluid; and
   comparing the measured density and the calculated density to determine the purity of the fluid.

2. The method of claim 1 further comprising:
   calculating a density difference between the measured density and the calculated density; and
   adjusting a volumetric flow rate measured by the flowmeter based on the density difference.

3. The method of claim 1 further comprising:
   calculating a density difference between the measured density and the calculated density; and
   adjusting a cost for an amount of the fluid based on the density difference.

4. The method of claim 1 further comprising:
   determining the find is substantially pure if the measured density equals the calculated density.

5. The method of claim 1 further comprising:
   determining the fluid is not substantially pure if the measured density does not equal the calculated density.

6. The method of claim 1 further comprising:
   determining a proportion of a majority component of the fluid based on the comparison of the measured density and the calculated density.

7. The method of claim 1 wherein the fluid comprises propane.

8. The method of claim 1 wherein the flowmeter comprises a Coriolis flowmeter.

9. The method of claim 1 wherein determining a calculated density of the fluid comprises:

receiving a temperature signal from the flowmeter; and processing the temperature signal to determine a temperature-varying density of the fluid, wherein the temperature-varying density represents the calculated density.

10. The method of claim 9 wherein processing the temperature signal to determine a temperature-varying density of the fluid comprises:

adjusting a reference density of the fluid based on a temperature of the fluid.

11. Circuitry configured to communicate with a flowmeter, the circuitry comprising:

an interface system configured to receive a pickoff signal from the flowmeter responsive to a fluid being flowed through the flowmeter; and a processing system configured to process the pickoff signal to determine a measured density of the fluid, determine a calculated density of the fluid, and compare the measured density and the calculated density to determine the purity of the fluid.

12. The circuitry of claim 11 wherein the processing system is configured to:

calculate a density difference between the measured density and the calculated density; and adjust a volumetric flow rate measured by the flowmeter based on the density difference.

13. The circuitry of claim 11 wherein the processing system is configured to:

calculate a density difference between the measured density and the calculated density; and adjust a cost for an amount of the fluid based on the density difference.

14. The circuitry of claim 11 wherein the processing system is configured to:

determine the fluid is substantially pure if the measured density equals the calculated density.

15. The circuitry of claim 11 wherein the processing system is configured to:

determine the fluid is not substantially pure if the measured density does not equal the calculated density.

16. The circuitry of claim 11 wherein the processing system is configured to:

determine a proportion of a majority component of the fluid based on the comparison of the measured density and the calculated density.

17. The circuitry of claim 11 wherein the fluid comprises propane.

18. The circuitry of claim 11 wherein the flowmeter comprises a Coriolis flowmeter.

19. The circuitry of claim 11 wherein the processing system is configured to:

process a temperature signal received from the flowmeter to determine a temperature-varying density of the fluid, wherein the temperature-varying density represents the calculated density.

20. The circuitry of claim 19 wherein the processing system is configured to:

adjust a reference density of the fluid based on a temperature of the fluid to determine the temperature-varying density of the fluid.

* * * * *

UNITED STATES PATENT AND TRADEMARK OFFICE
CERTIFICATE OF CORRECTION

PATENT NO. : 6,745,135 B2
DATED : June 1, 2004
INVENTOR(S) : Michael J. Keilty and Andrew T. Patten It is certified that error appears in the above-identified patent and that said Letters Patent is hereby corrected as shown below:

Column 10,
Line 53, "find" should be changed to -- fluid --.

Signed and Sealed this

First Day of February, 2005

JON W. DUDAS
*Director of the United States Patent and Trademark Office*